(12) United States Patent
Kusters

(10) Patent No.: US 7,198,210 B2
(45) Date of Patent: Apr. 3, 2007

(54) METHOD AND DEVICE FOR DESTROYING CONFIDENTIAL DOCUMENTS

(75) Inventor: Gerardus Jacobus Marie Kusters, Velden (NL)

(73) Assignee: Syntech Holdings B.V., Venlo (NL)

( * ) Notice: Subject to any disclaimer, the term of this patent is extended or adjusted under 35 U.S.C. 154(b) by 145 days.

(21) Appl. No.: 10/982,180

(22) Filed: Nov. 5, 2004

(65) Prior Publication Data

US 2006/0097089 A1    May 11, 2006

(51) Int. Cl.
*B02C 19/00* (2006.01)
(52) U.S. Cl. .................... 241/30; 241/101.2
(58) Field of Classification Search ............ 110/341; 700/215, 223, 224; 241/30, 101.2
See application file for complete search history.

(56) References Cited

U.S. PATENT DOCUMENTS

| 5,231,938 | A | * | 8/1993 | Gore | 110/346 |
| 5,333,146 | A | * | 7/1994 | Vance | 373/60 |
| 5,339,751 | A | * | 8/1994 | Tutt | 110/186 |
| 5,675,056 | A | * | 10/1997 | Vance | 588/311 |
| 6,125,774 | A | * | 10/2000 | Kohler et al. | 110/346 |
| 6,766,751 | B2 | * | 7/2004 | Liu | 110/341 |
| 2002/0196150 | A1 | * | 12/2002 | Wildman | 340/573.1 |

* cited by examiner

*Primary Examiner*—Mark Rosenbaum
(74) *Attorney, Agent, or Firm*—Roberts & Roberts, LLP

(57) ABSTRACT

A method for destroying confidential documents, including the steps of a) keeping one or more confidential documents in a container, b) identifying the container, c) storing identification data relating to the container in question in an electronic data system, d) establishing the identity of one or more containers, e) comparing the identity as established in step d) with the data from the electronic data system of step c), and f) destroying the containers if the identity of the container in question as established in step d) corresponds to the identification data of the container in question from the electronic data system as stored in step c).

20 Claims, No Drawings

METHOD AND DEVICE FOR DESTROYING CONFIDENTIAL DOCUMENTS

The present invention relates to a method and a device for destroying confidential documents.

At present the destruction of confidential documents is carried out by collecting the confidential documents, after which the collected documents are placed in a container, which container is subsequently sealed. The container thus sealed is presented to a destruction company, after which the actual destruction takes place, for example by shredding or incinerating. In practice, such a system of storing confidential documents and subsequently presenting the same to a specialised company has appeared to be liable to fraud. After all, if a large number of containers are presented to the destruction company, the possibility of a few of such containers being taken away and not being destroyed is not inconceivable. Thus one might assume that all the confidential documents have been destroyed, which is not the case.

Thus it is an object of the present invention to provide a device and a method for destroying confidential documents wherein the risk of fraud is reduced to a minimum.

Another object of the present invention is to provide a method and a device for destroying confidential documents at any point in time, wherein so-called "tracking and tracing" of the confidential documents takes place so as to make it possible to track the confidential documents during the process of presenting and destroying the same.

Another object of the present invention is to provide a method and a device for destroying confidential documents wherein use is made of electronic storage systems, such as computers, in order to be able to establish the location of the confidential documents at several stages during the process of presenting and destroying.

The method as referred to in the introduction is characterized in that it comprises the steps of:

a) keeping one or more confidential documents in a container, b) identifying the container, c) storing identification data relating to the container in question in an electronic data system, d) establishing the identity of one or more containers, e) comparing the identity as established in step d) with the data from the electronic data system of step c), and f) destroying the containers if the identity of the container in question as established in step d) corresponds to the identification data of the container in question from the electronic data system as stored in step c).

By keeping the confidential documents in a container, which container is provided with an identity, the container in question can be tracked during the process from the presentation to the destruction thereof. Moreover, the actual destruction of the container as referred to in step f) is only carried out if the established identity of the container in question corresponds to the identification data of the container in question as stored in the electronic data system. Thus, the risk of fraud is minimised. In addition, according to the invention the destruction of so-called unknown containers, viz. containers that cannot be retraced in the electronic data system, is not possible. The risk of fraud is thus minimised in this case as well.

In a special embodiment it is desirable to carry out a number of additional intermediate steps between step c) and step d), viz.:

k) generating a list of containers to be collected from the electronic data system, which list includes identification data relating to the containers to be collected, l) establishing the identity of a container to be collected, m) comparing the identity as established in step l) with the identification data from the list generated in step k), n) collecting the collected container if the identification data of step l) correspond to the identification data of step k).

The fact is that in practice the containers to be destroyed will have to be collected at different locations, for example at companies or clients. By generating a list of containers to be collected from the electronic data system, which list is subsequently compared to the identification data of the collected containers, it is ensured that precisely those containers that are to be destroyed are presented to the destruction company.

In a special embodiment of the present method, the step b) of identifying the container preferably also comprises the registration of the contents thereof, for example by means of x-rays, ultrasound detection and metal detection, which step is also carried out in step d) to make certain that the correct container will be destroyed.

It is furthermore preferable to carry out step e), viz. comparing the identity as established in step d) with the data from the electronic data system of step c), twice before the actual destruction according to step f) takes place. Such a double check is in particular desirable with a view to reducing the liability to fraud of the present method. After all, there is a possibility that a container to be destroyed is taken out of the destruction process once it has been established that the identity of the container in question corresponds to the identification data that are stored in the electronic data system, so that the confidential documents that are present in the container are not destroyed. As a result of the introduction of a second identification operation, it is no longer possible to remove a container that has already been identified, and the identified container will actually be destroyed.

The identification code used in the present method is selected from the group consisting of bar code, Radio Frequency ID tags, 2-D Matrix code, 3-D bar code and image code, or a combination thereof, which identification code comprises one or more data regarding the serial number, the date, the dimensions of the container, the weight of the container, the colour of the container, external features of the container, the location, the department and the person, for example. The weight of the container is a parameter that is important for determining whether the container has been opened without authorisation in the course of the process from identifying the container to destroying the container. It should be understood, however, that the present invention is by no means limited to such a list of identification codes.

The present invention furthermore relates to a device comprising means for keeping one or more confidential documents in a container, means for identifying the container, means for storing identification data relating to the container in question in an electronic data system, means for establishing the identity of one or more containers, means for comparing the established identity with the data from the electronic data system, and means for destroying the containers.

In a special embodiment, the device furthermore comprises means for generating a list of containers to be collected from the electronic data system, which list includes identification data relating to the containers to be collected, means for establishing the identity of a container to be collected, means for comparing the identification data of the container to be collected with the identification data from the list of identification data relating to the containers to be collected, means for collecting containers.

Preferably, the device furthermore comprises means for storing identification data of the collected containers in the electronic data system, with the device furthermore comprising means for making a visual recording of the container. In a special embodiment, the device preferably comprises means for determining the weight of the container.

In a preferred embodiment, the device furthermore comprises means for assigning a unique identification code to the container, which identification code is selected from the group consisting of bar code, Radio Frequency ID tags, 2-D Matrix code, 3-D bar code and image code, or a combination thereof, said identification code in particular comprising one or more data regarding the serial number, the date, the location, the department and the person. In a special embodiment, the present invention furthermore comprises means for registering the contents of the container, for example by means of x-rays, ultrasound detection and metal detection, which means function as an additional step for identifying the container at the beginning of the process and subsequently identifying it again prior to the destruction thereof and comparing the measurement data with each other so as to establish whether one and the same container is concerned.

The means for destroying the container furthermore comprise means for transporting the containers and means for granulating the containers thus transported.

The present invention will be explained hereinafter by means of an example, in which connection it should be noted, however, that the present invention is by no means limited to such a special embodiment.

The confidential document is placed into a container, for example a security envelope. An identification code, for example a bar code, is present on said envelope. After the envelope has been sealed, it cannot be opened anymore without causing visible damage to the envelope. This is also referred to as "tamper evident". Subsequently, the operator inputs the number of the envelope from his or her computer into the electronic data system. Data relating to the document (the name of the person where the envelope is to be collected, the location of said collection, the weight, the size, the colour, etc) may be added thereto.

The data that have been input into the system by the operator are subsequently sent to the operator PC. Furthermore, the contents of the envelope may be determined by carrying out a suitable analysis method, for example x-rays, which data are also input into the data system. When the document collector decides to collect the envelopes (this may take place several times a day), he or she will first have to download the information regarding the envelopes to be collected from the operator PC into a suitable apparatus, for example a bar code terminal. Furthermore, one or more lists may be printed via the operator PC, which lists contain all the data of the envelopes to be collected. A list may for example include the name (and possibly a photo) of the person where the envelope(s) is (are) to be collected, the location of said collection as well as the numbers of the envelopes. Preferably, information concerning the contents of envelopes is not present on the list, but such information is not relevant to the document collector anyway.

The document collector can now start collecting the envelopes on the basis of said list(s). Once the collector has arrived at a workplace, the envelope is read into a bar code terminal by scanning it with said terminal. After said scanning, the document collector can view information about the envelope in question (but not about the contents thereof) on a display device, for example a display screen. The process is completed by inputting a confirmation into the bar code terminal, and the document collector can continue on his or her way to a new location. This process is repeated until the operator has worked through all the lists.

Once the document collector has finished collecting the envelopes, the envelopes are taken to the disintegration room. After delivering the envelopes, the document collector returns to the operator PC and the bar code terminal is read out. The data are now processed in the system. After said processing, the document collector can print a list and see whether he or she has collected all the envelopes.

Now that the data of the collected envelopes have been processed in the system, the operator can start the destruction process.

Before the operator can start loading the storage conveyor, he must first unlock the cover of the storage conveyor (mechanical locks), after which he can open the cover. Following this, the fan, the granulator and the conveyor belt are successively started. Then the operator scans the envelopes one by one by means of a bar code terminal. The data of the envelopes are compared to the data in the operator PC. When the data match, the envelope may be placed in the storage conveyor. Said placing of the envelopes must take place in such a manner, however, that the camera can record an image of the envelopes and the bar code reader can read the bar codes of the envelopes.

If the operator scans an envelope whose data do not correspond to the data in the system (for example: the bar code is not recognised or the number of the envelope is not listed in the system), the system will generate a message to that effect and the operator will have to put aside the envelope in question. A second person will have to find out why the envelope is being rejected. Only when the error has been eliminated the envelope can be scanned anew and be placed in the storage conveyor. In the meantime, the operator will normally continue to scan the next envelopes and place them in the storage container until all the envelopes have been scanned and are present in the storage container.

The conveyor belt causes the envelopes to fall into the granulator eventually, but before this happens, the bar codes of the envelopes are read once more. The reason why the bar codes of the envelopes are read once more is to prevent fraud upon placement of the envelopes in the storage conveyor. At the beginning of the conveyor belt it would be possible for the operator, having scanned the envelope by means of the bar code terminal, to remove the envelope from the conveyor belt and possibly put another envelope (or no envelope at all) in its place. By disposing a bar code reader at the end of the conveyor belt, at the location where no one can reach it anymore, the system can detect any attempt at fraud and generate a message to that effect. After all, the envelopes must pass the bar code reader in the same order in which they were scanned by the operator. If such is not the case, the system will generate an error message.

As an additional check, a picture is furthermore taken of every envelope at the end of the conveyor belt. Once all the envelopes have been destroyed, the machine can be stopped and the cover of the storage conveyor can be unlocked and be opened.

Subsequently, the operator can print a report containing the data of the destruction process from the operator PC. Said report may include the following data: the numbers of the destroyed envelopes, the numbers of envelopes which may have been placed on the conveyor belt but which were not registered in the system, and the numbers of envelopes which were registered in the system but which were not destroyed. The report may furthermore include a number of process data, such as: the batch number, the date and the time of the destruction process, the duration of the destruction process, the name of the operator, the name of the security officer, the total weight of all the destroyed envelopes, etc. This report is subsequently handed over to the supervisor for verification.

The invention claimed is:

1. A method for destroying confidential documents, comprising the steps of:
   a) keeping one or more confidential documents in a container,
   b) identifying the container,
   c) storing identification data relating to the container in an electronic data system,
   d) establishing the identity of one or more other containers,
   e) comparing the identity of one or more other containers as established in step d) with the data from the electronic data system of step c), and
   f) destroying the containers if the identity of the one or more other containers as established in step d) corresponds to the identification data of the container from the electronic data system as stored in step c).

2. The method according to claim 1, wherein the following intermediate steps are carried out between step c) and step d):
   k) generating a list of containers to be collected from the electronic data system, which list includes identification data relating to the containers to be collected,
   l) establishing the identity of a container to be collected,
   m) comparing the identity as established in step 1) with the identification data from the list generated in step k),
   n) collecting the collected container if the identification data of step 1) correspond to the identification data of step k).

3. The method according to claim 2, comprising an additional step o) which is carried out after step n), which step o) comprises the storage in the electronic data system of the identification data of the containers that have been collected in step n).

4. The method according to claim 1 wherein step e) is carried out twice before step f) takes place.

5. The method according to claim 1 wherein step d) further comprises the making of a visual recording of the container.

6. The method according to claim 1 wherein a visual recording is made of the container to be destroyed before the destruction step f) is carried out.

7. The method according to claim 1 wherein step a) further comprises the assigning of a unique identification code to the container.

8. The method according to claim 7, wherein the identification code is selected from the group consisting of a bar code, Radio Frequency ID tags, a 2-D Matrix code, a 3-D bar code, an image code, and combinations thereof.

9. The method according to claim 7 wherein the identification code comprises one or more data regarding the serial number, the date, the location, the department and the person associated with the identification code.

10. The method according to claim 1 wherein step a) is carried out in such a manner that the container cannot be opened without being visibly damaged.

11. The method of claim 1 which further comprises the step of confirming the identity of a container immediately prior to the destroying of the container in step (f).

12. The method of claim 11 which further comprises the step of generating a report which includes identification data relating to the containers which have been destroyed in step (f).

13. A device for destroying confidential documents, comprising:
   means for keeping one or more confidential documents in a container,
   means for identifying the container,
   means for storing identification data relating to the container in an electronic data system,
   means for establishing the identity of one or more other containers,
   means for comparing the established identity with the data from the elcetronic data system, and
   means for destroying the containers.

14. The device according to claim 13, which further comprises:
   means for generating a list of containers to be collected from the electronic data system,
   which list includes identification data relating to the containers to be collected,
   means for establishing the identity of a container to be collected,
   means for comparing the identification data of the container to be collected with the identification data from the list of identification data relating to the containers to be collected,
   means for collecting containers.

15. The device according to claim 13 which further comprises means for storing identification data relating to the collected containers in an electronic data system.

16. The device according to claim 13 which further comprises means for making a visual recording of the container.

17. The device according to claim 13 which further comprises means for assigning a unique identification code to the container.

18. The device according to claim 17, wherein the identification code is selected from the group consisting of a bar code, Radio Frequency ID tags, a 2-D Matrix code, a 3-D bar code, an image code, and combinations thereof.

19. The device according to claim 17 wherein the identification code comprises one or more data regarding a serial number, a date, a location, a department and a person associated with the identification code.

20. The device according to claim 13 wherein the means for destroying the containers further comprises means for transporting the containers and means for granulating the transported containers.

* * * * *